United States Patent [19]

Mansfield et al.

[11] 4,101,776

[45] Jul. 18, 1978

[54] IMAGE INTENSIFIER T. V. FLUOROSCOPY SYSTEM

[75] Inventors: Brian A. Mansfield, London; Royston K. Watkins, Surrey, both of England

[73] Assignee: U.S. Philips Corporation, New York, N.Y.

[21] Appl. No.: 743,536

[22] Filed: Nov. 22, 1976

[30] Foreign Application Priority Data

Nov. 25, 1975 [GB] United Kingdom ............... 48361/75

[51] Int. Cl.[2] ............................................ G03B 41/16

[52] U.S. Cl. .............................. 250/416 TV; 250/409

[58] Field of Search ............... 250/401, 402, 408, 409, 250/413, 416 TV; 358/111

[56] References Cited

U.S. PATENT DOCUMENTS

| | | | |
|---|---|---|---|
| 3,198,947 | 8/1965 | Arrison | 250/409 |
| 3,567,854 | 3/1971 | Tschanty | 250/409 |
| 3,783,286 | 1/1974 | Kremer | 250/409 |

*Primary Examiner*—Craig E. Church

*Attorney, Agent, or Firm*—Frank R. Trifari; Jack E. Haken

[57] ABSTRACT

A fluoroscopic X-ray system with automatic exposure control wherein the gain of the automatic exposure control feedback loop is increased at high X-ray intensities.

9 Claims, 5 Drawing Figures

IMAGE INTENSIFIER T. V. FLUOROSCOPY SYSTEM

Figure 1:
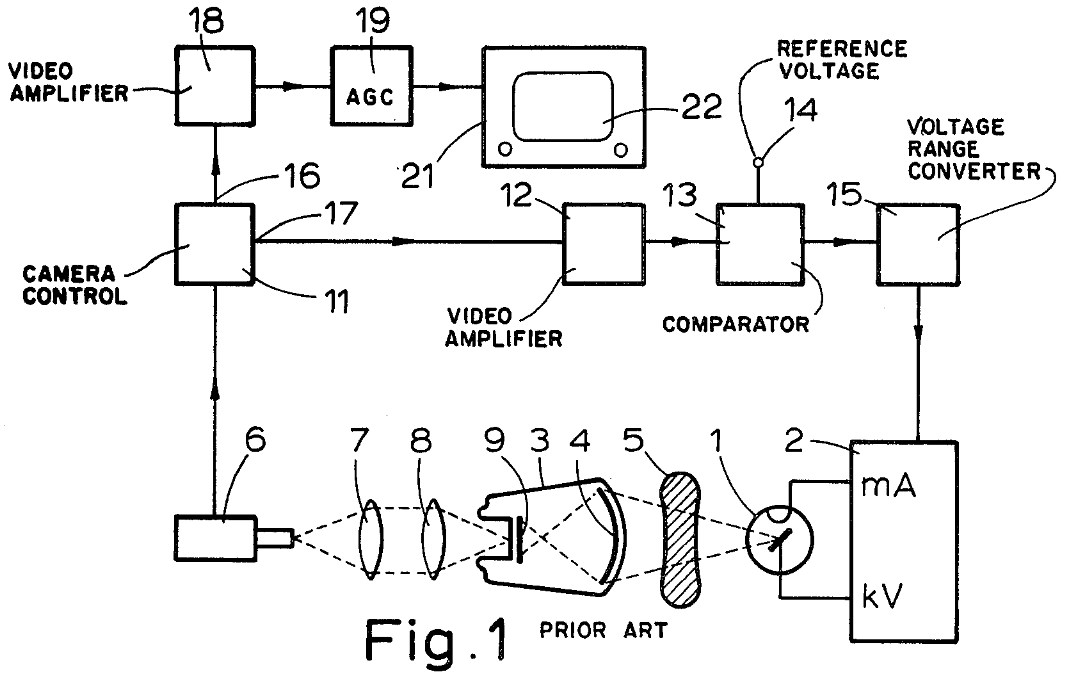
Fig.1 PRIOR ART

This invention relates to an image intensifier TV fluoroscopy system with automatic exposure rate control. Such a system is arranged as a closed loop comprising an X-ray tube, an image intensifier so located relative to the X-ray tube as to be able to receive X-rays therefrom after passage through an object exposed to the X-rays, a television camera arranged to view at least a portion of the output optical image of the intensifier, and X-ray exposure rate control means responsive to output signals of the camera to control the exposure rate delivered by the tube in dependence upon the light intensity of at least a portion of said optical image viewed by the camera.

In such a system, hereinafter referred to as being of the type described, the light intensity of the optical image is maintained reasonably constant with change in the impedance to X-rays of the object being examined. Thus, for example, the object may be changed from a low impedance (e.g. a human hand) to a comparatively high impedance (e.g. a human abdomen) without any substantial change in the intensity of the image. The output of the camera is fed via an automatic gain control (AGC) circuit to a monitor screen, the visible image thereon being used for diagnostic purposes. By suitably controlling the X-ray exposure rate in dependence upon the light intensity of the optical image to give the required brightness and contrast, optimum viewing conditions for examination and diagnostic purposes are automatically achieved irrespective of change of X-ray impedance of the object.

One advantage of a system of the type described is that, due to the automatic exposure rate control, the exposure rate is automatically held at an amount just sufficient for diagnostic purposes, thus keeping the exposure rate as low as possible. In systems without automatic exposure rate control, the exposure rate has to be manually adjusted for each change in object impedance. Such manual adjustment has two major disadvantages. Firstly, it is possible for a patient being examined to receive a higher exposure to X-rays than is necessary for diagnostic purposes and, secondly, the adjustment becomes cumbersome and difficult when the X-ray impedance of the subject is changing, e.g. when observing the passage through a patient's body of a substance opaque to X-rays. These disadvantages are, of course, overcome in the system of the type described.

More-detailed description of systems of the type described are given, for example, in "An X-ray TV-chain with integrated exposure rate control", Birken and Heise, Medicamundi, Volume 14, No. 2, pages 97 to 99; "Stabilization in fluoroscopy", Gorissen, Medicamundi, Volume 13, No. 3, pages 94 to 97; and Patent Specification No. 1,018,935.

Experience with systems of the type described has, somewhat surprisingly, shown that at exposure rates towards the higher end of the range, e.g. rates required for examining fairly high impedance objects, the exposure rate provided with manual control by a skilled radiologist is sometimes less than that provided with the automatically-controlled system. This is mainly due to the fact that when thick sections of the human body, e.g. the abdomen of a large patient, are being examined, considerable scattering of the received X-rays occurs, with the result that not only is a higher exposure rate required to obtain the necessary brightness but also the scattering produces background noise, generally referred to as 'fog', which tends to reduce the picture quality. Increasing the exposure rate, however, increases the fog proportionately; so although the image brightness may be increased to the predetermined level, no significant improvement is achieved in the diagnostic value of the image. Thus a skilled operator operating a manually-controlled system knows that no improvement will be achieved if the exposure rate is increased under these circumstances and, in order to keep the patient dosage as low as possible, does not increase the exposure rate. In the automatic system of the type described, of course, the loop control operates automatically to increase the brightness to the required level, i.e. it increases the exposure rate. Thus the patient receives a higher exposure rate than is necessary.

The object of the invention is to provide an automatic system which at least considerably mitigates the abovementioned disadvantage.

According to one aspect of the present invention there is provided a system of the type described further including automatic control means which, in operation of the system, increases the loop gain of the closed loop if the anode voltage applied to the X-ray tube exceeds a predetermined voltage. Preferably, the loop gain is increased by an amount proportional to the amount by which the anode voltage exceeds the predetermined voltage.

Since the exposure rate is a function of, inter alia, the anode voltage, variation of the anode voltage varies the exposure rate. Further, since the loop gain controls the anode voltage, a change in loop gain changes the exposure rate. Thus if the anode voltage is below the predetermined voltage, the system functons in the same manner as the system described since the loop gain is not affected by the automatic control means. When the anode voltage is increased above the predetermined voltage, i.e. representing a higher-than-average impedance to X-rays in the X-ray path, the automatic control means causes the loop gain to increase, with the result that the anode voltage does not increase to the extent it would increase without the automatic control means. Thus if we assume that the impedance to X-rays of a section being studied is increased steadily from a minimum to a maximum value then the exposure rate initially increases at a steady rate sufficient to maintain the optical image viewed by the camera at a constant brightness. When the exposure rate reaches a predetermined value (i.e. when the tube anode voltage reaches the predetermined voltage) the automatic control means comes into operation such that, from that point on, the increase in exposure rate is not sufficient to maintain the said constant brightness, with the result that the exposure rate under these conditions is less than that with the system of the type described. Although the brightness is less than with the latter system under these conditions, the brightness of the picture on a monitor screen associated with the camera is not affected since the video signal from the camera is fed to the monitor via an automatic gain control (AGC) circuit. In practical tests, a system according to the invention was provided with a switch the operation of which converted the system to a system of the type described so that the picture quality afforded by the two systems could be compared. No significant difference in picture quality was apparent between the two systems.

According to another aspect of the invention there is provided a system of the type described, wherein the closed loop further includes a variable gain device the gain of which is controlled, by the output of a difference detector arranged to detect, in operation of the system, the difference between the said exposure rate and a predetermined exposure rate, in such a manner that the gain of the device is held substantially constant if the exposure rate is equal to or less than the predetermined rate and that the gain of the device is automatically increased if the exposure rate exceeds the predetermined rate. Preferably, the gain of the device is increased by an amount proportional to the amount by which the exposure rate exceeds the predetermined rate.

By setting the predetermined exposure rate at a level which is suitable for the average diagnostic conditions, as determined by the particular purpose for which the particular system is mainly used, then the exposure rate does not increase proportionately as the X-ray impedance of the subject is increased beyond that representative of the predetermined exposure rate. The result of this is that, for exposure rates up to the predetermined level, the light intensity of the optical image is maintained constant by the normal loop system since the gain of the variable gain device is held constant over this range. If the exposure rate increases beyond the predetermined rate, then the gain of the variable gain device increases with the result that the normal loop control is, in effect partially over-ridden and the light intensity of the said optical image decreases due to the fact that the dosage rate is not increased to the same extent as with the system of the type described. This decrease of light intensity of the optical image is not apparent on the picture on the monitor screen, however, since this decrease is made up by the AGC circuit. Thus, for all practical purposes, there is no significant difference in the picture on the monitor screen, for a comparatively high X-ray impedance subject, between a system of the type described and a system according to the invention. In the latter system, however, the exposure rate may be reduced by up to 50% compared with the former.

Preferably, the gain of the variable gain device is held substantially at unity when the exposure rate is equal to or less than the predetermined rate. With exposure rates up to the predetermined rate, the system therefore behaves exactly the same as the system of the type described.

Preferably, the maximum gain factor of the variable gain device is in the range 1.5 to 2.5. With a maximum gain of less than 1.5, less than an optimum reduction of exposure rate is achieved and with a gain higher than 2.5 system noise can detract from the picture quality on the monitor screen.

In a preferred embodiment, the variable gain device is a voltage-controlled amplifier and the difference detector includes an operational amplifier. Such amplifiers are readily available in integrated circuit form.

Figure 2:
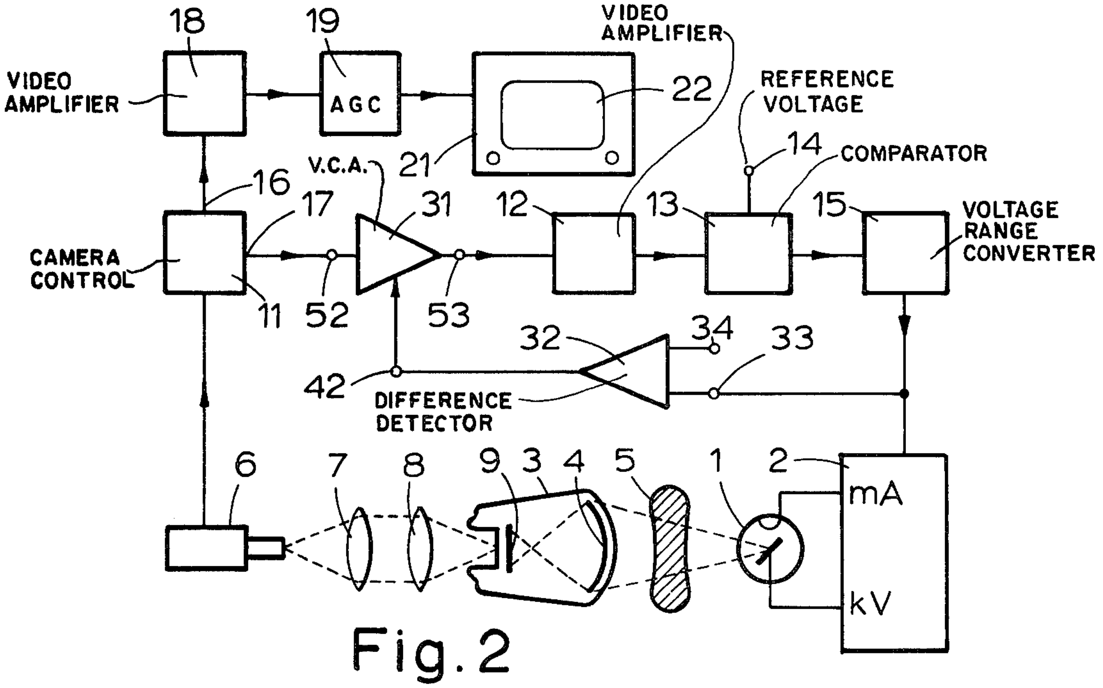
Figure 3:
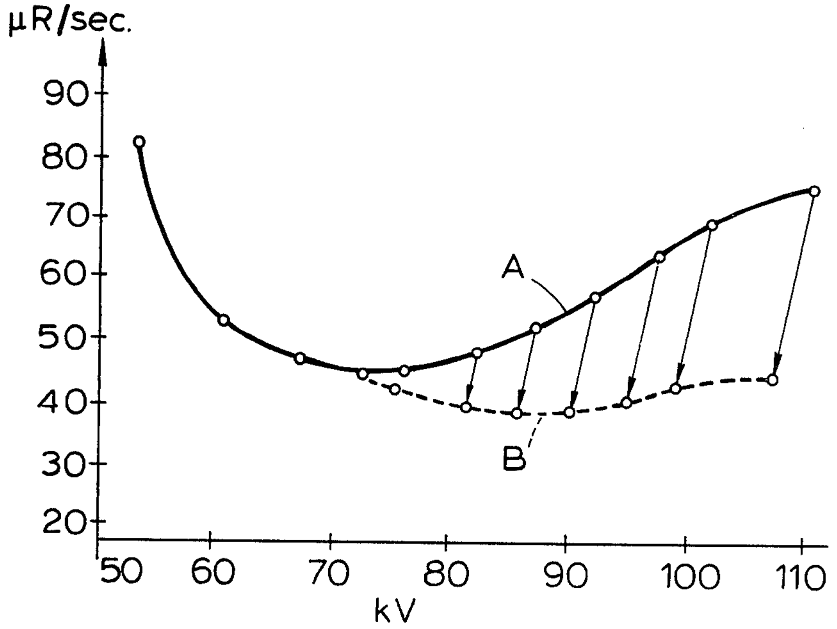
Figure 4:
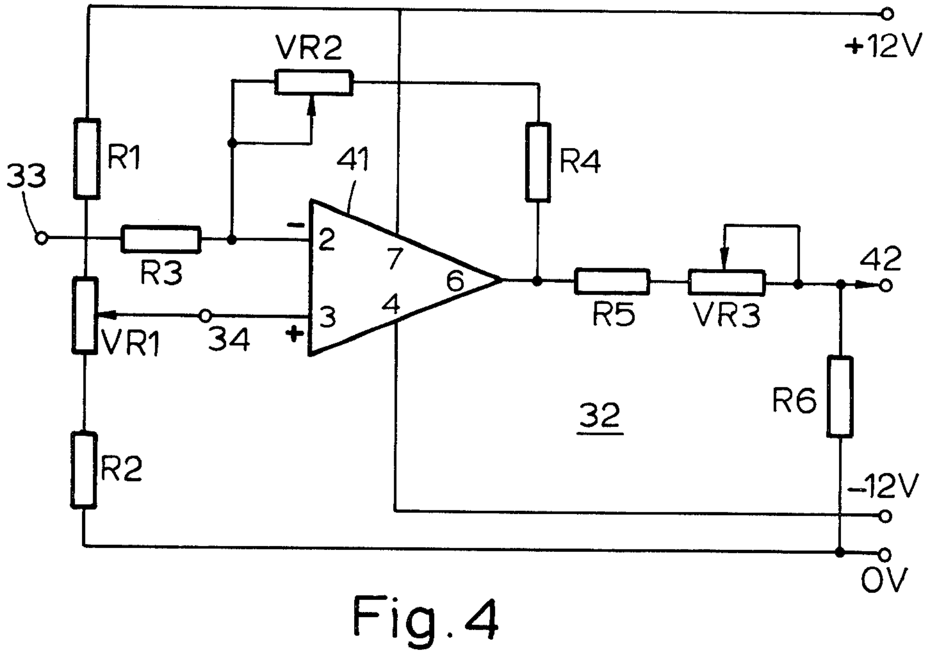
Figure 5:
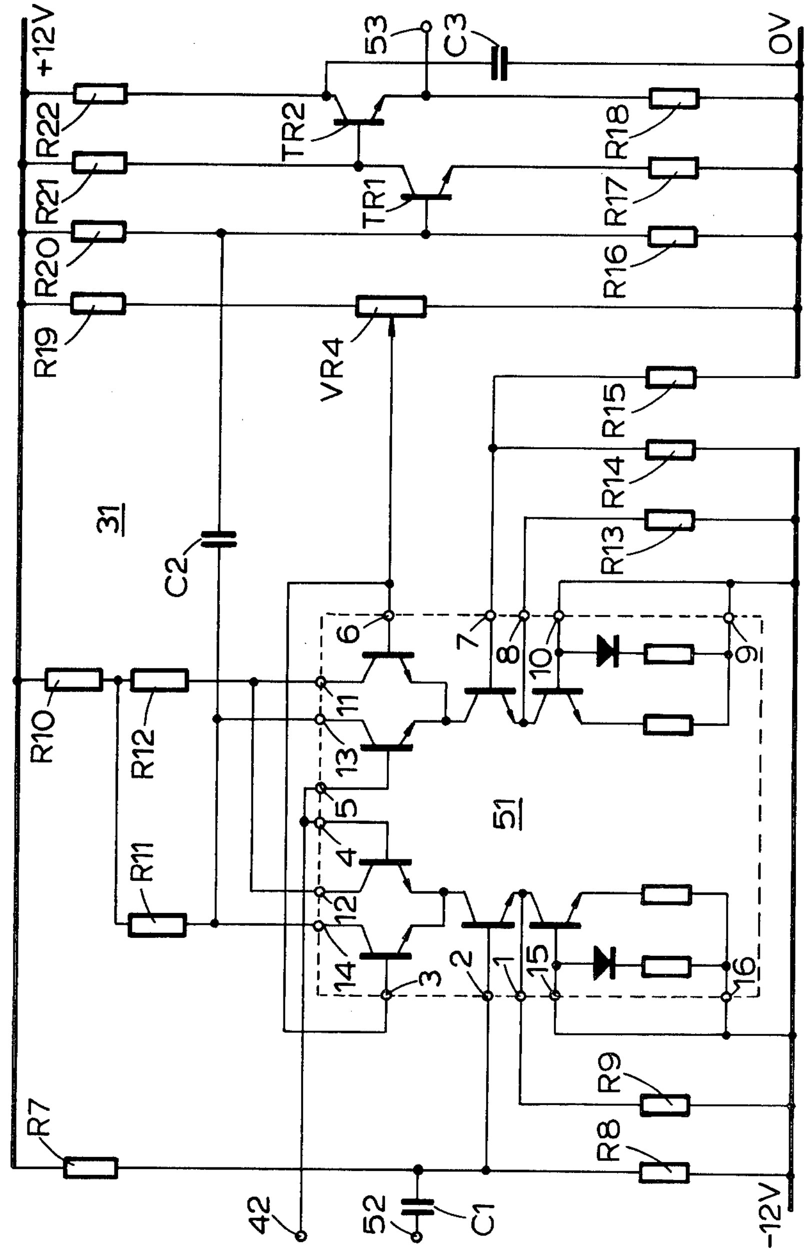

An embodiment of the invention will now be described, by way of example, with reference to the accompanying drawings, of which:

FIG. 1 shows a simplified block-schematic circuit of a known closed-loop system of the type described, FIG. 2 shows a block-schematic circuit of a system according to the invention, FIG. 3 shows a graph comparing the dose rates received by the image intensifiers of FIGS. 1 and 2 for varying anode voltages, and FIGS. 4 and 5 respectively show detailed circuit diagrams of embodiments of a difference detector and of a variable gain device for a system according to the invention.

Referring now to FIG. 1, a known closed loop system of the type described includes an X-ray tube 1 provided with heater current (referred to simply as mA) and target anode voltage (referred to simply as kV) from a generator 2, an image intensifier 3 arranged in relation to tube 1 so as to receive, on its input screen 4, X-radiation from tube 1 via section 5 of an object to be examined, a television camera 6 and a lens system 7, 8, arranged such that the camera is focussed on the optical image screen 9 of intensifier 3, at camera supply and control unit 11, a video amplifier 12, a comparator 13 having an input 14 for a reference voltage, and a voltage range converter 15 the output of which controls the kV and mA provided by generator 2.

X-rays emitted from tube 1 pass through section 5 on to screen 4 of intensifier 3, the rays being selectively absorbed by section 5 to produce an X-ray image of section 5 on screen 4. Intensifier 3 intensifies the X-ray image and produces a corresponding optical image on screen 9. This image, or a selected part thereof, is scanned by camera 6, via lens system 7, 8, under the control of control unit 11 to produce corresponding video signals on outputs 16 and 17 of unit 11. The video signal on output 17 is amplified by video amplifier 12 which produces an analogue voltage proportional either to the peak or to the average level of the video signal. This voltage, which is thus representative of the light intensity of the optical image viewed by camera 6, will be assumed, for the purposes of explanation only, to have a range of zero volts ('black' level) to 12 volts (peak 'white' level). This voltage is fed to one input of comparator 13 which compares this voltage with a reference voltage on terminal 14 and provides the difference voltage at its output. If, for example, the reference voltage is 6 volts, then the output voltage range from black to peak white levels is $-6$ volts to $+6$ volts respectively. The output voltage range of comparator 13 is converted in voltage range converter 15 to a corresponding range of 11 to 4 volts. The reference voltage on terminal 14 is selected to give the required optimum brightness on image screen 9 of intensifier 9, i.e. neither too bright nor too dim for viewing purposes. This 11-to-4 volt output range of converter 15 controls generator 2 in such a manner that an 11 volt signal produces the maximum permissible X-radiation from tube 1 and a 4 volt signal produces the minimum permissible radiation.

In general it may be said that, during fluoroscopic examination, the anode voltage of the X-ray tube varies between 40 and 120 kV and controls the contrast of the picture and that the current fed to the tube varies between 0.3mA and 3.0mA and controls the brightness of the picture. Brightness and contrast are interdependant to some extent with the result that, for any given condition, both the mA and kV require adjustment to provide optimum visualisation. Thus although the 11 to 4 volt signal could be used to control the mA only in order to control the brightness, or indeed that kV only to control the contrast (and hence indirectly the brightness), in practice, the kV and the mA are linked together in generator 2 so that both increase together (but not necessarily in linear relationship). In the present example it will be assumed that an 11 volt input signal to generator 2 causes the latter to generate 110kV and 3.0mA and a 4 volt signal causes it to generate 40kV and 0.3mA.

If it is now assumed that the signal input to generator 2 is at 11 volts, the picture on image screen 9 is at maximum brightness and the resulting peak white video signal input to video amplifier 12 causes the output of the latter to be 12 volts. The output of range converter 15 thus tends to drop towards 4 volts. The moment this output drops below 11 volts, however, the output of generator 2 — and hence the picture brightness — also decreases, with the result that the level of the input signal to comparator 13 drops. This loop control action continues until the signal input to comparator 13 is approximately 6 volts. In a similar manner, if the picture brightness is initially too low, the output of tube 1 will automatically be increased until the predetermined picture brightness is obtained.

A further video output signal on output 16 of control unit 11 is fed via a video amplifier 18 and an AGC circuit 19 to a TV monitor 21 which displays the image viewed by camera 6 on screen 22. The gain factor of amplifier 18 and the AGC level of circuit 19 are chosen to provide a picture of suitable brightness and contrast on screen 22, whereafter the AGC circuit maintains the brightness during any changes in the image brightness of image screen 9.

Control unit 11 typically includes control circuitry which determines the portions — part or whole — of the image on screen 9 for which relevant video signals are provided on outputs 16 and 17. Thus, for example, the whole of the viewed image (the "monitor circle") may be reproduced on screen 22 whereas only the video signals relating to a smaller part of the image ("measuring field circle") appear at output 17. The size relationship between the monitoring and measuring field circles is generally prefixed so that adjustment of the monitor circle size causes corresponding adjustment of the size of the measuring field circle.

As stated in the introduction, it has been observed that at the higher end of the kV range, for example when examining the abdomen of a large person, a larger radiation dose was given to a patient by an automatic exposure rate control system than by a manually-controlled system. It would appear that two factors contribute to this situation. Firstly, the operator tends to set a lower dose rate for a thicker (higher impedance) section since experience with radiographs would indicate that picture quality would be reduced — due to scatter, etc. — by increasing the kV to restore brightness. Secondly, the gain of the image intensifier falls off as the kV is increased so that for a given light output a higher input dose to the intensifier is needed at 100 kv than at 70 kV. FIG. 3 shows (solid line curve A) the results of tests carried out to determine the dose rate received by the image intensifier under varying operating conditions with a known system with automatic dose rate control. The dose, in micro-Roentgens per second ($\mu$R/sec), received by the image intensifier was measured with a dose rate meter and a reading was taken for each of many sections of differing X-ray impedances. For each impedance, the system automatically provides the particular kV value which maintains the brightness, viewed by the camera, at the constant level. Since each kV value is directly representative of a given impedance, the received dose rate is plotted against the kV value for each particular impedance chosen.

As can be seen from curve A of FIG. 3, the received dose rate increases as the kV value increases above approximately 72 kV in order to maintain constant brightness. This means that as the section impedance increases beyond that represented by the lowest point on the curve, the kV value increases at a higher rate than that necessary to cater for the increase in impedance since it also has to compensate for the reduced gain of the intensifier at higher kV values.

FIG. 2 shows an embodiment of the invention which uses the known system of FIG. 1 as a basis. Items corresponding to those in FIG. 1 are given corresponding reference numerals. In FIG. 2, a voltage controlled amplifier 31 is included in the closed loop between output 17 of control unit 11 and the input of video amplifier 12. The gain of amplifier 31 is controlled by the voltage output of a difference detector 32 which detects the difference between the output voltage of range converter 15 appearing on input terminal 33 and a reference voltage on input terminal 34. A more-detailed description of the operation of detector 32 and amplifier 31 will be given subsequently with reference to FIGS. 4 and 5 respectively.

For present purposes it is to be understood that difference detector 32 is so arranged that if the voltage on input 33 is less than the reference voltage on input 34, then the detector provides a constant output voltage (e.g. 11.3V) irrespective of the difference between the two input voltages. As the voltage level increases above the reference voltage level, so the output voltage of detector 32 drops towards zero volts. Taking the previous example where the output voltage range of converter 15 is 4 to 11 volts, and assuming that the reference voltage on input 34 of detector 32 is 7 volts, then the output of detector 32 is constant at 11.3 volts as the voltage on input 33 increases from 4 to 7 volts, whereafter the output drops from 11.3 volts to zero volts proportionately with an increase of input volts on input 33 from 7 volts to 11 volts. With a control voltage input from detector 32 of 11.3 volts, the gain factor of amplifier 31 is held substantially constant, preferably at unity. Thus so long as the input to generator 2 is less than 7 volts, (i.e. the resulting anode voltage is less than 70 kV) then the system functions in the manner described with reference to FIG. 1, i.e. with anode voltages in the range 40 to 70 kV, the image brightness on screen 9 is held substantially constant. Amplifier 31 is so arranged that if the control voltage input on terminal 42 steadily decreases from 11.3 V to zero volts so the gain factor of the amplifier is steadily increased and reaches a predetermined maximum gain when the control voltage is reduced substantially to zero. This maximum gain factor is preferably in the range 1.5 to 3 since a gain factor of less than 1.5 gives a decrease in the maximum exposure rate which is hardly worthwhile and a gain factor in excess of 3 tends to reduce visuality of the picture due to loop noise. The optimum gain factor is approximately 2, as will be apparent from the following description.

The operation of the system with an output voltage from converter 15 in the range 7 to 11 volts is such that, as this voltage increases from 7 to 11V, so the gain factor of amplifier 31 — and hence the gain of loop 31, 12, 13, and 15 — increases. As a result of this increase in loop gain, the automatic compensating effect of the main closed loop is offset to an extent such that the hitherto constant image brightness is no longer maintained constant but is progressively decreased to an extent determined by the gain factor of amplifier 31. A practical example will serve to illustrate this. Let it first be assumed that amplifier 31 and detector 32 are switched out of circuit, such that the system becomes that shown in FIG. 1, and that the output of converter 15 is 10 volts (100 kv on the tube anode). This means that if the range conversion of converter 15 is linear, the input voltage thereto is approximately −4.3 V. This represents an input voltage to comparator 12 of 1.7 V if the reference voltage on terminal 14 is 6 V. If video amplifier 12 has a gain factor of 10 (which is typical) then the average input level to this amplifier is 170 mV.

If the amplifier 31 and detector 32 are now switched into circuit (FIG. 2), the gain factor of amplifier 31 is, with 10 volts on terminal 33, approximately 1.75 — assuming that the gain factor increases linearly from 1 to 2 as the voltage on input 33 increases from 7 to 11 volts. The 170 mV input to amplifier 12 now becomes approximately 300 mV, the amplifier output becomes 3.0 volts, and the output voltage of converter 15 tends to drop towards 9.25 volts. Immediately this output voltage starts to drop, the kV also drops proportionately, the image brightness therefore reduces and the input to amplifier 31 reduces. Thus the system finally settles down with a tube anode voltage somewhere between 92.5 and 100 kV. In the practical embodiment under these circumstances, the final anode voltage was, in fact, 97 kV. In this way it can be seen that, as the kV value increases above a predetermined threshold value, so the exposure rate provided by a system according to the invention becomes progressively less that that provided by a system of the type described. This difference can be seen by comparing the broken-line curve B of FIG. 3 with curve A. Curve B was plotted by using each of a series of progressively increasing impedances for section 5. For each impedance, amplifier 31 and detector 32 were first switched out of circuit (FIG. 1) and the point representing the dose received by the image intensifier and the kV value was plotted (curve A). Detector 32 and amplifier 31 were then switched back into circuit and the new point plotted (curve B). For this series of tests, amplifier 31 and detector 32 were so arranged that the gain factor of amplifier 31 was unity with an input voltage on input 33 from 4 to 7.2 volts (equivalent to a kV range of 40 to 72 kV) and that the gain factor increased linearly from unity to 2 as the input voltage on input 33 increased from 7.2 to 11V (72 to 110 kV). The corresponding plots on curves A and B for each impedance are indicated by arrows, from which it can be seen that, at the maximum anode voltage of 110 kV, the dose rate received by the image intensifier is approximately 40% less than that with a system of the type described. A greater reduction, (e.g. 50%) could be achieved by increasing the gain factor of amplifier 31 slightly.

Since the dose rate received at screen 4 is reduced at higher kV levels compare with that of the known system, then obviously the X-radiation from tube 1 is correspondingly reduced and section 5 is given a lower exposure rate. As stated above, no difference in picture quality between the system described and the system according to the invention was noticeable on monitor screen 22, any difference to image brightness being compensated by AGC circuit 19.

As can be seen from FIG. 3, the dose rate received at the surface of the image intensifier is substantially constant if the gain factor of amplifier 31 is approximately 2 at the highest input level. If this factor is reduced to lower than 1.5 at the highest kV level, only a marginal reduction in exposure rate is achieved over the known system. If the factor is raised to more than 3 at the highest kV level, picture quality is reduced at this level due to noise.

Suitable circuit arrangements for detector 32 and amplifier 31 will now be described with reference to FIGS. 4 and 5 respectively.

The difference detector 32 shown in FIG. 4 comprises six resistors R1 to R6, three potentiometers VR1 to VR3 and a differential amplifier 41 having inverting (−) and non-inverting (+) inputs. Differential amplifier 41 is well known per se and may, for example, comprise an integrated circuit Type TBA 221 (available from Mullard Limited) or a Type 741 (available from Texas Instrument Corporation). The reference numerals shown within the amplifier block 41 refer to the appropriate terminal numbering of integrated circuit Types TBA 221 and 741.

The reference voltage applied to input terminal 34 of detector 32 is derived from a voltage-dividing resistance chain, comprising resistor R1, potentiometer VR1 and resistor R2 in series, connected between a OV and a +12V supply. Potentiometer VR2 enables the reference voltage to be preset to any required value within the range available. This reference voltage is applied to the non-inverting (+) input on terminal 3 of amplifier 41. The input signal representative of the kV value applied to input 33 (see also FIG. 2) of the detector 32 is fed to the inverting input (−) on terminal 2 of amplifier 41 via resistor R3. An adjustable feed-back resistance, comprising resistor R4 and potentiometer VR2 (strapped as a variable resistor), is connected between the output of amplifier 41 and the inverting input. As is known, the gain factor of amplifier 41 may be adjusted by selecting the appropriate feed-back resistance.

The circuit operates in well known manner, i.e. the output remains constant at a high value (+11.3 volts with the circuit values used-see Table) so long as the control voltage on input 33 is more negative than the reference voltage on terminal 34. When the control voltage reaches and exceeds the reference voltage, the output voltage of amplifier 41 drops proportionately, the proportionality being determined by the resistance values of VR2 and R4. In the practical embodiment, VR2 was adjusted so that the output voltage reached OV when the input voltage reached +11V. A portion of this output voltage is fed to the voltage control input of amplifier 31 via a voltage-dividing resistance chain R5, VR3, R6 and terminal 42.

The voltage-controlled amplifier 31 shown in FIG. 5 comprises an amplifier 51 of the known dual balanced modulator/demodulator type, available in integrated circuit form, for example, from Mullard Limited as Type No. TCA 240. The reference numerals shown within the block outline of amplifier 51 denotes the terminal numbers of the integrated circuit block Type TCA 240. As can be seen from the Figure, the integrated circuit block 51 contains two separate long-tailed pairs with a respective control transistor in each tail. The external circuitry, comprising resistors R7 to R22, potentiometer VR4, capacitors C1 to C3, and transistors TR1 and TR2, provides substantially identical d.c. biasing conditions for the two long-tailed pairs and the collector outputs of the two transistor pairs are cross-connected with respect to the interconnected gate electrodes of the pairs. The reason for the use of two long-tailed pairs and the cross coupling is to maintain, as near as possible, a fairly constant current through each of resistors R11 and R12. This means that it is possible to make fairly rapid changes in the control voltage input whilst maintaining the d.c. level of the varying amplitude video signal. The base voltage applied to inputs 3 and 6 of circuit block 51 via potentiometer VR4 determines the maximum amplification factor of the amplifier, while the base voltage applied to inputs 4 and 5 of the circuit block 51, i.e. the control voltage applied to terminal 42 via R5, VR3, R6 of FIG. 4, is used to reduce this maximum gain factor to the desired level. Thus taking the example already given, VR3 and VR4 are adjusted so that the gain factor of the whole amplifier 31 is maintained at unity if the input control voltage on terminal 33 of detector 32 is between 4V and 7.2V and so that the gain factor amplifier 31 steadily increases to a maximum value in the range 1.5 to 2.5 as the said input control voltage steadily increases from 7.2V to 11.3V.

The video signal appearing on output 17 of control unit 11 (FIG. 2) is fed to the control gate input 2 of circuit block 51 via terminal 52 and d.c. blocking capacitor C1 and the video signal output of circuit block 51 is fed via a d.c. blocking capacitor C2 to the base of transistor TR1; resistors R16 and R20 providing the base bias and resistors R17 and R21 respectively providing the emitter and collector loads of this transistor. The output of transistor TR1 is fed directly to the base of transistor TR2 which is an emitter follower having resistor R18 as the emitter load and the output video signal being taken from the emitter to the input of video amplifier 12 (FIG. 2) via terminal R53. Capacitor C3 is a by-pass capacitor for collector resistor R22.

The circuit values of the various components shown in FIGS. 4 and 5 are given in the following Table.

R1 — 3,300 ohms
R2 — 1,500 ohms
R3 — 33,000 ohms
R4 — 68,000 ohms
R5 — 470 ohms
R6 — 15 ohms
R7 — 10,000 ohms
R8 — 3,300 ohms
R9 — 560 ohms
R10 — 22 ohms
R11 — 1,000 ohms
R12 — 1,000 ohms
R13 — 560 ohms
R14 — 2,700 ohms
R15 — 8,200 ohms
R16 — 5,600 ohms
R17 — 220 ohms
R18 — 1,200 ohms
R19 — 33,000 ohms
R20 — 15,000 ohms
R21 — 470 ohms
R22 — 330 ohms
VR1 — 10,000 ohms
VR2 — 22,000 ohms
VR3 — 4,700 ohms
VR4 — 1,000 ohms
C1 — 12.5 μF
C2 — 12.5 μF
C3 — 15 KpF

What we claim is:

1. An image intensifier TV system comprising:
an X-ray source for directing X-rays through a body;
television pickup means including an image intensifier which receives X-rays which pass through said body and which produces an image therefrom, and camera means which provide a video signal from said image;
display means which produce a display from said video signal and which include an automatic gain control function;
negative feedback means having a closed loop which adjust target anode voltage and current applied to said X-ray source in response to the level of said video signal; and
automatic control means which increases a loop gain of the closed loop if said target anode voltage exceeds a predetermined voltage.

2. A system as claimed in claim 1 including a variable gain factor device in series with the closed loop and means for increasing the gain factor of said device by an amount dependent upon the amount by which the anode voltage exceeds the predetermined voltage.

3. An image intensifier TV system comprising:
an X-ray source for directing X-rays through a body;
television pickup means including an image intensifier which receives X-rays which pass through said body and which produces an image therefrom and camera means which produce a video signal from said image;
display means which produce a display image from said video signal and which include an automatic gain control function;
negative feedback means including a closed loop having a variable gain function which adjust a target anode voltage and current applied to said X-ray source in response to the level of said video signals; and
difference detector means which function to detect the difference between an exposure rate produced by said X-ray source and a predetermined exposure rate and which control the gain function to hold said gain function constant if the exposure rate of the source is less than or equal to the predetermined rate and to increase the gain function if the exposure rate of the source exceeds the predetermined rate.

4. A system as claimed in claim 3 wherein the gain function of the device is increased proportionally to the amount by which the exposure rate of the source exceeds the predetermined rate.

5. A system as claimed in claim 3, wherein the variable gain function is substantially unity if the exposure rate of the source is equal to or less than the predetermined rate.

6. A system as claimed in 3, wherein the maximum gain function is in the range from 1.5 to 2.5.

7. A system as claimed in claim 6, wherein the said maximum gain function is 2.

8. A system as claimed in claim 3, wherein the variable function includes a voltage-controlled amplifier.

9. A system as claimed in claim 8, wherein the difference detector means include a differential amplifier having a reference voltage source connected to one input thereof and a control voltage connected to a second input thereof, which control voltage serves to control the target anode voltage of the X-ray source.

* * * * *